April 11, 1933.  T. W. THIRLWELL  1,903,580
AUTOMATIC SWITCH
Filed Aug. 30, 1929　2 Sheets-Sheet 1
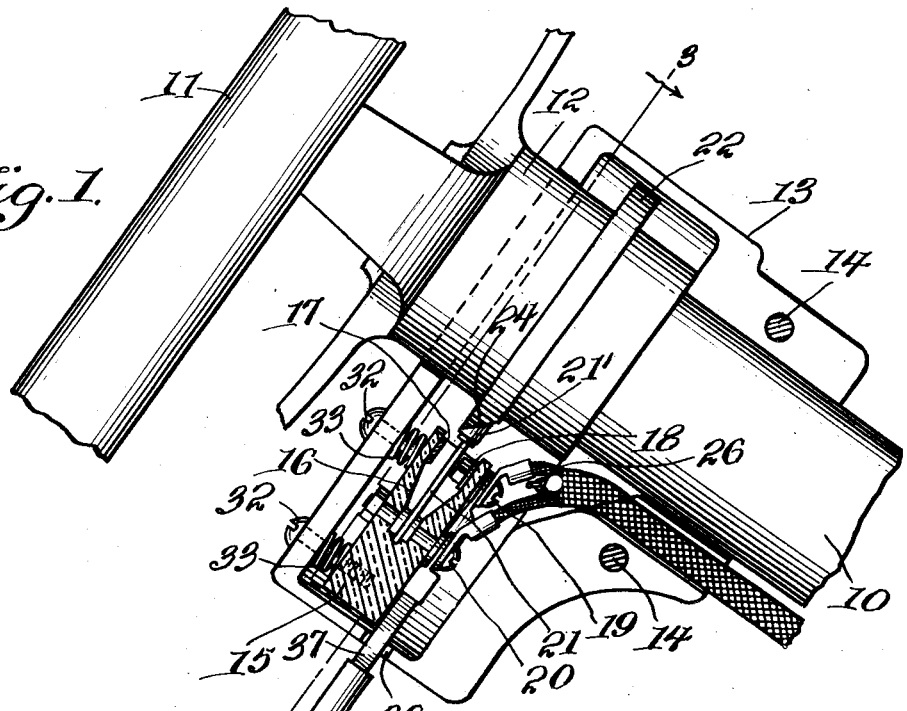
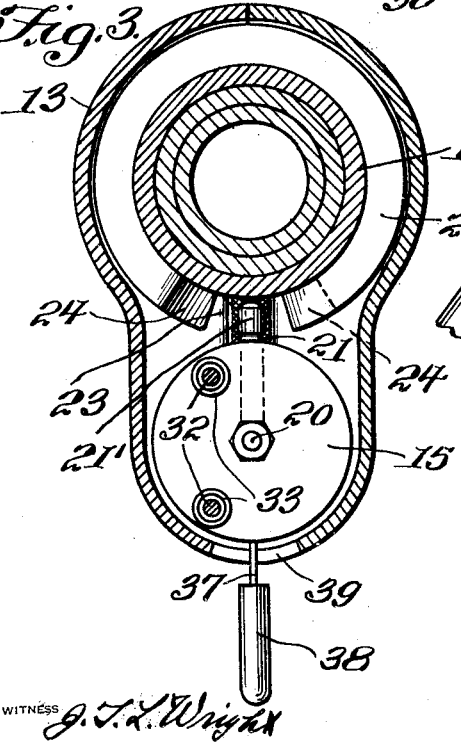
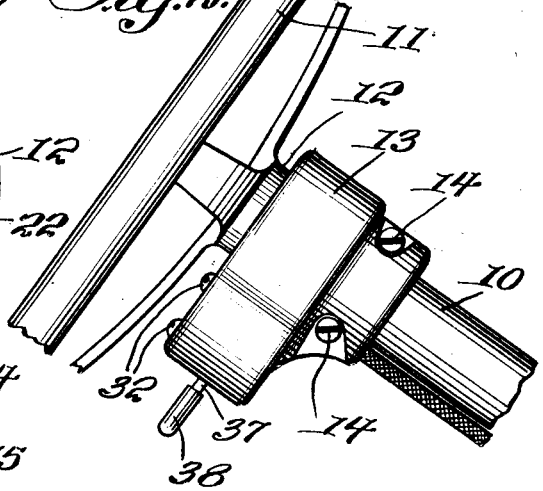
Thomas W. Thirlwell
INVENTOR
BY Victor J. Evans
ATTORNEY
WITNESS J. T. L. Wright April 11, 1933.  T. W. THIRLWELL  1,903,580
AUTOMATIC SWITCH
Filed Aug. 30, 1929  2 Sheets-Sheet 2
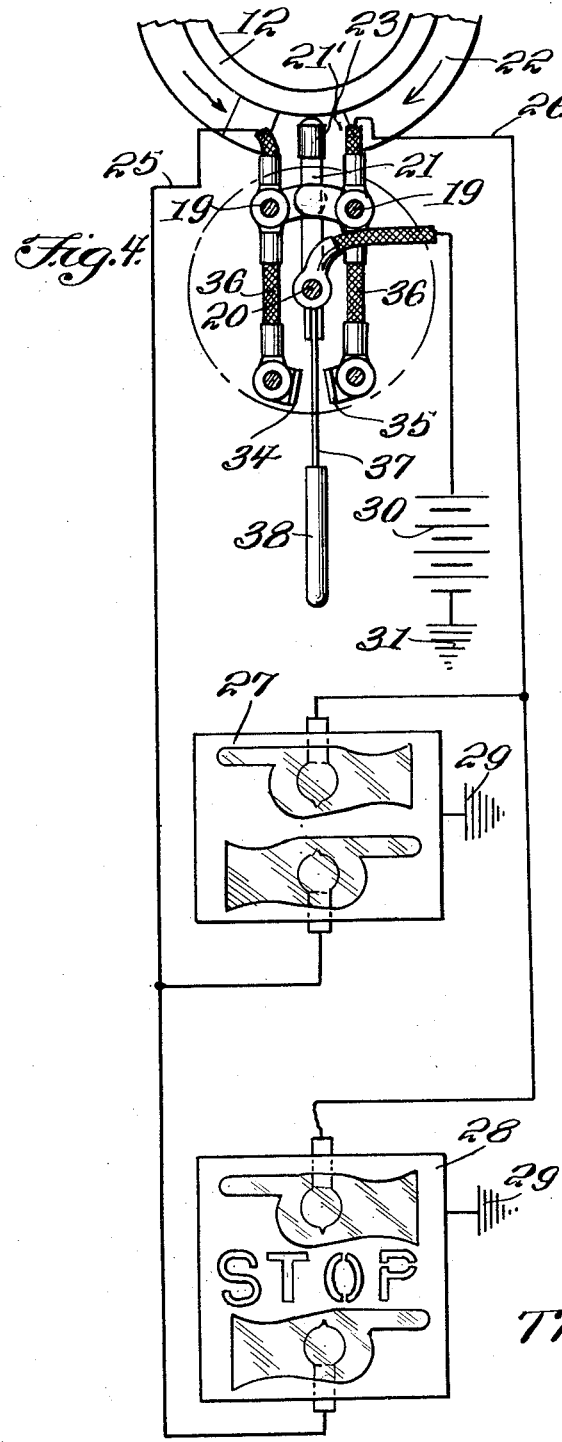
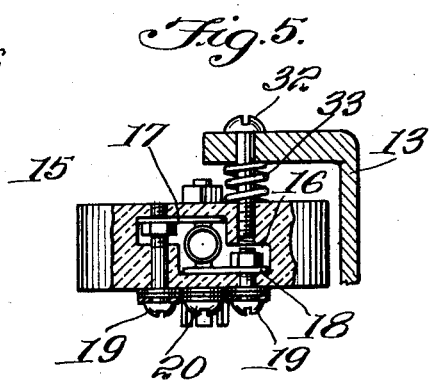
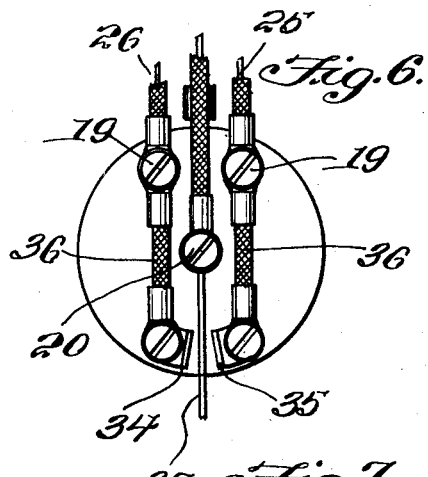
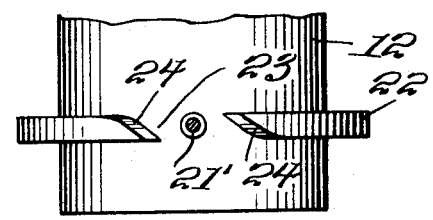
Thomas W. Thirlwell
INVENTOR
BY Victor J. Evans
ATTORNEY
WITNESS: J. T. L. Wright Patented Apr. 11, 1933

1,903,580

UNITED STATES PATENT OFFICE

THOMAS WILLIAM THIRLWELL, OF ST. ALBANS, WEST VIRGINIA

AUTOMATIC SWITCH

Application filed August 30, 1929. Serial No. 389,498.

This invention relates to electric switches designed for controlling separate circuits, the invention being especially adapted for use in connection with the steering mechanism of an automobile for the purpose of operating separate signal devices.

Another object of the invention is the provision of a switch for the above purpose which may be both automatically and manually controlled, so that the driver of the automobile may close a circuit through a signal device in advance of making a turn, and the switch be automatically operated to maintain the circuit closed as soon as the wheel is operated to begin the turn and without the assistance of the driver.

Another object of the invention is the provision of a switch in which the parts may be readily and accurately adjusted to insure proper operation at all times.

A further object of the invention is the provision of a switch, which in addition to the above and other advantageous features, is simple in construction, and may be readily mounted upon the steering column of an automobile.

With the above and other objects in view, the invention further includes the following novel features and details of construction, to be hereinafter more fully described, illustrated in the accompanying drawings and pointed out in the appended claim.

In the drawings:—

Figure 1 is a fragmentary view illustrating the switch as applied to the steering column of an automobile, one section of the switch housing being removed.

Figure 2 is a fragmentary elevation with both sections of the housing applied.

Figure 3 is a sectional view on the line 3—3 of Figure 1.

Figure 4 is a diagrammatic view illustrating the use of the invention.

Figure 5 is an edge view of the switch block partly broken away and showing a fragmentary portion of the housing in section.

Figure 6 is a bottom plan view of the switch block.

Figure 7 is a fragmentary elevation illustrating the relative positions of the ends of the cam rib, the switch arm roller being shown in section and in neutral position.

Referring to the drawings in detail wherein like characters of reference denote corresponding parts, the reference character 10 indicates a portion of the steering column of an automobile and 11 a portion of the steering wheel, the latter being mounted upon the steering shaft through the medium of a collar 12.

The invention is designed to be mounted upon the steering column and for this purpose provides a housing 13. This housing is formed of a pair of complemental sections which are detachably connected by means of screws or bolts 14, so that the switch may be readily mounted upon the collar.

Arranged within the housing 13 is a switch block 15. This block is formed of insulating material and is recessed as shown at 16. The recess is preferably shaped as shown in Figure 5 of the drawings and its opposite walls have secured thereto spaced contact plates 17 and 18. These plates are connected with terminal screws 19 which may also serve to hold the plates in position.

Mounted within the recess 16 upon a terminal post or screw 20 is the inner end of a resilient switch arm 21. This arm extends outward beyond the periphery of the block 15 and preferably carries a roller 21'.

The roller 21' is arranged in the path of a cam rib 22 for the purpose of flexing the switch arm into and out of engagement with the contact plates. This rib may extend around the collar 12 of the steering wheel, in which case the roller 21' is formed of insulating material. If desired however, a separate sleeve formed of insulating material may be secured to the steering shaft and this sleeve may carry the cam rib. Where the sleeve and rib are made of insulating material, the roller 21' if desired, may be of metal.

The rib 22 extends about the collar 12 as previously stated, and its opposite ends are spaced apart so as to provide a neutral space 23, as shown in Figure 3 of the drawings. This neutral space is designed to accommodate the roller 21' when the steering wheel is positioned to steer the automobile straight ahead. In this position the switch arm 21 is equally spaced from the contact plates 17 and 18.

As thus far described it will be apparent that when the steering wheel is rotated to change the direction of travel of the vehicle, the cam rib 22 will engage the roller 21' and move the switch arm into engagement with either the contact 17 or the contact 18, in accordance with the direction of rotation of the steering wheel.

By reference to Figures 1 and 7 of the drawings it will be seen that the extremities of the cam rib 22 are beveled as indicated at 24. In addition, these extremities 24 are oppositely disposed so as to engage upon opposite sides of the switch arm, as clearly shown in Figure 7 of the drawings.

The screws 19 of the contact plates 17 and 18 are connected with conductor wires 25 and 26. These wires 25 and 26 are connected with a signal device 27 suitably mounted at the front of an automobile and a signal device 28 at the rear, the device being grounded as indicated at 29. The signal device 27 may include oppositely arranged hands or pointers which are illuminated through the operation of the switch, while the signal device 28, in addition to these hands or pointers, may contain the word Stop. This word however is adapted to be illuminated through the operation of one of the controlling pedals of the automobile.

The post 20 of the switch arm 21 is adapted to be connected to a battery 30 which is grounded as shown at 31, so as to complete a circuit through the signal device when the switch is closed.

By reason of the inclined extremities 24 of the cam rib, as soon as the rib engages the roller 21', the latter will be quickly moved so that the switch arm will engage one of the contacts at the beginning of the turn, while the remaining or major portion of the cam rib will ride the roller 21' to hold the arm and contact engaged until the turn is completed and the vehicle straightened out.

It is necessary to properly position the roller 21' so as to insure proper contact between the switch arm and the contacts 17 and 18, when the switch is operated. For this purpose means are provided to adjust the switch block 15 and consequently adjust the position of the roller. This adjustment may be effected by providing the housing with openings for the passage of adjusting screws 32. These screws extend into the housing and have their ends threadedly engaged with the switch block. Springs 33 surround the screws between the switch block and the adjacent wall of the housing, so that by manipulating the screws, the switch block may be moved with respect to the housing to properly position the roller with respect to the cam rib.

The switch block further includes spaced contacts 34 and 35. These contacts are connected with the conductor wires 25 and 26 by means of conductors 36. The post 20 also has secured thereto the inner end of a manually operated switch arm 37 which is provided with a handle 38. This arm extends through an opening 39 provided in the housing.

By means of the switch arm 37, the driver of the automobile may manually close a circuit through the signal devices by moving the arm 37 into engagement with the proper contact 34 or 35. This operation of the switch may be effected in advance of making the turn so as to warn pedestrians and the drivers of other vehicles. As soon as the turn is begun however, the driver releases the switch arm 38 and the circuit is automatically closed by means of the cam rib 22, as previously described.

The invention is susceptible of various changes in its form, proportions and minor details of construction and the right is herein reserved to make such changes as properly fall within the scope of the appended claim.

Having described the invention what is claimed is:—

In combination with a steering wheel having a collar, a rib mounted upon the collar and partially circumscribing the same, said rib having spaced ends with beveled surfaces, a casing located opposite the rib, an insulated supported member in said casing and having a recess disposed opposite the rib, means adjustably securing the insulated member to the casing, oppositely disposed contacts located in the recess, a switch arm movably mounted in the recess to control electric circuits, said switch arm having an end portion adapted to be engaged by the surfaces of the rib and said switch arm adapted to pass through the space between the ends of the rib.

In testimony whereof I affix my signature.

THOMAS WILLIAM THIRLWELL.